US011281005B2

(12) United States Patent
Song et al.

(10) Patent No.: US 11,281,005 B2
(45) Date of Patent: Mar. 22, 2022

(54) COMPACT HEAD-MOUNTED DISPLAY SYSTEM WITH ORTHOGONAL PANELS

(71) Applicant: Sharp Kabushiki Kaisha, Osaka (JP)

(72) Inventors: Chengze Song, Oxford (GB); William Frederick Smith, Oxford (GB); David James Montgomery, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 16/535,800

(22) Filed: Aug. 8, 2019

(65) Prior Publication Data

US 2021/0041698 A1 Feb. 11, 2021

(51) Int. Cl.
*G02B 27/01* (2006.01)
*G02B 17/02* (2006.01)

(52) U.S. Cl.
CPC ....... *G02B 27/0172* (2013.01); *G02B 17/023* (2013.01); *G02B 27/0176* (2013.01); *G02B 2027/015* (2013.01); *G02B 2027/0145* (2013.01)

(58) Field of Classification Search
CPC ............ G02B 27/0172; G02B 27/0176; G02B 17/023; G02B 2027/0145; G02B 2027/015

See application file for complete search history.

(56) References Cited

U.S. PATENT DOCUMENTS

| | | | |
|---|---|---|---|
| 2002/0181115 A1* | 12/2002 | Massof | G02B 27/0172 359/630 |
| 2002/0196554 A1 | 12/2002 | Cobb et al. | |
| 2008/0117289 A1* | 5/2008 | Schowengerdt | G02B 26/005 348/46 |
| 2014/0168783 A1 | 6/2014 | Luebke et al. | |
| 2018/0063520 A1* | 3/2018 | Chung | H04N 13/388 |
| 2020/0026084 A1* | 1/2020 | Kwon | G02B 3/0037 |
| 2020/0081254 A1* | 3/2020 | Tam | G02B 27/0176 |
| 2020/0298114 A1* | 9/2020 | Onozawa | G06F 3/017 |
| 2021/0018760 A1* | 1/2021 | Wang | G02B 27/0172 |

FOREIGN PATENT DOCUMENTS

| | | |
|---|---|---|
| CN | 1391126 A | 1/2003 |
| WO | WO 2015/077718 A9 | 5/2015 |
| WO | WO 2016118643 A1 | 7/2016 |

* cited by examiner

*Primary Examiner* — Collin X Beatty
(74) *Attorney, Agent, or Firm* — Renner, Otto, Boisselle & Sklar, LLP

(57) ABSTRACT

A head-mounted display (HMD) has an enhanced optical arrangement that permits high-resolution imaging in a compact device. The HMD system includes an optical arrangement; a first image panel, wherein the optical arrangement directs image light from the first image panel along a first optical pathway having a first length; and a second image panel arranged orthogonal to the first image panel, wherein the optical arrangement directs image light from the second image panel along a second optical pathway different from the first optical pathway having a second length. The first length is equal to the second length, and the optical arrangement is configured such that light from the first image panel and the second image panel are emitted from the HMD system in a combined fashion in a first eye direction. The optical arrangement may include a plurality of mirror components and a plurality of lens components, wherein the plurality of mirror components are configured to direct image light from the first and second image panels along respective optical pathways to the plurality of lens components.

19 Claims, 10 Drawing Sheets

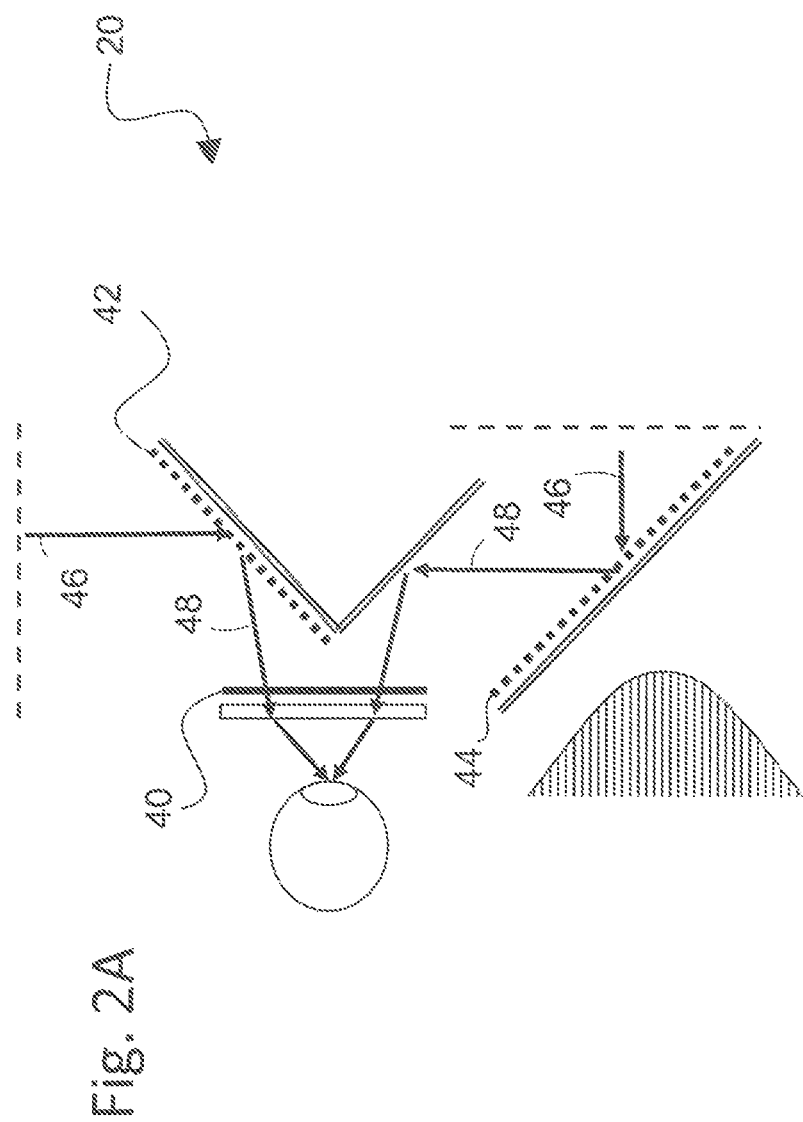

COMPACT HEAD-MOUNTED DISPLAY SYSTEM WITH ORTHOGONAL PANELS

TECHNICAL FIELD

The present invention has application within the field of compact wearable displays, and in particular, head-mounted display (HMD) systems used for applications such as virtual reality and augmented reality.

BACKGROUND ART

A head-mounted display (HMD) system is a type of wearable device with increasing popularity within the consumer electronics industry. HMDs, along with similar devices such as helmet-mounted displays, smart glasses, and virtual reality headsets, allow users to wear a display device such that the hardware remains fixed to their heads regardless of the user's movement.

When combined with environmental sensors such as cameras, accelerometers, gyroscopes, compasses, and light meters, HMDs can provide users with experiences in virtual reality and augmented reality. Virtual reality (VR) allows a user to be completely submerged into a virtual world where everything the user sees comes from the display device. Devices that provide augmented reality (AR) allow users to optically see the environment, and images generated by the display device are added to the scene and may blend in with the environment. Accordingly, traditional VR and AR technology involves a display that is mounted in front of the user's head with a lens configuration that determines the virtual image position and field.

A basic layout of typical commercial VR or AR systems (both involving and not involving use of a smartphone for a display) includes a display device and a lens structure that images the display light into the far field to enable comfortable viewing. To ensure sufficient magnification, with wide field of view and to have a virtual image at a far enough distance from the eye, the size of this arrangement is restricted. In addition, the display is a relatively far distance from the eyes, meaning that the device must be strapped to the head to not fall off. Furthermore, the weight of the device is far forward when worn, meaning that long term viewing could become tiresome on the face and neck due to the torque generated about the head by the weight of the device. Lens elements used in such systems may be configured as a normal curved surface lens of known type, or a structured Fresnel lens with angled features of known type, or other known lens arrangements involving one or more lenses. For example, US 2002/0181115 A1 (Massof, published Dec. 5, 2002) describes a head mounted display that uses a plurality of lenses tangent to the surface of a sphere to form a montage of display images to the user.

One of the primary elements of HMDs is the display module mounted onto the head. However, since the unaided human eye cannot accommodate (that is, change optical power to provide a focused image) for images closer than a certain distance from the eye, eyepiece lenses are required to re-image the image from the display module to form a virtual image and field that appears to be at a comfortable viewing distance from the user. Such optical configuration requires substantial space between the eyepiece and the display module. Furthermore, complex lenses are needed if the HMD needs to display images with high quality and a wide field of view (FOV). The result of these requirements in conventional systems is a heavy and bulky headset that is uncomfortable to wear for any length of time, and the size is limited by basic optics to achieve the correct magnification and the virtual image distance. For example, WO 2016/118643 A1 (Benitez, published Jul. 28, 2016) describes an immersive display with a prism that reflects/refracts light of a panel at a specific order.

A number of known methods have been used to attempt to achieve image panel-based, light-weight HMDs without the need for bulky eyepiece lenses. "Light-field displays" (also known as integral imaging) provide for one of the thinnest types of HMD systems, but along with other magnifier-based HMDs, light-field displays suffer from a fundamental limit whereby the resolution of the display is heavily traded off for a smaller hardware form factor. For example, US 2014/0168783 A1 (Luebke, published Jun. 19, 2014) describes a near-eye light field display, which uses a plurality of microlenses located in the near-eye range of an observer to simulate an object that is in focus to an observer.

One known method for reducing the size and weight of an HMD system includes the use of a polarization reflection approach to reduce size. Such configurations, however, suffer from ghost image formation. Another method uses multiple small lenses with overlapping images that modify the magnification required. For example, WO 2015/077718 A9 (Benitez, published May 28, 2015) describes an immersive HMD with a plurality of lenslets that are not translationally symmetrical. However, such an arrangement has a lower apparent resolution and can suffer from visibility of the image overlap. Applicant's commonly owned Application GB 1621621.0, filed Dec. 19, 2016, describes an alternative overlap method with two displays and a folded W-shaped mirror arrangement. Applicant's commonly owned application U.S. Ser. No. 16/212,815, filed Dec. 7, 2018, demonstrates a similar overlap method with parallel image panels to have wider horizontal field of view. However, U.S. Ser. No. 16/212,815 can experience seam visibility of the image overlap. The field of view in this case is defined by the maximum aperture and path length.

SUMMARY OF INVENTION

There is a need in the art, therefore, for an enhanced HMD system that is compact and comfortable to wear, without sacrificing image quality as needed for optimal VR and AR applications. The present invention provides for HMD configurations that are light weight and comfortable for viewing, with high image quality and a wide field of view (FOV). Configurations of an HMD system described in this disclosure improve image quality in folded optical arrangements that use segmented images from multiple image panels.

The HMD system of the present disclosure reduces seam visibility of systems using segmented images while maintaining compactness. Configurations of the HMD system employ a combination of image panels that are orthogonal to one another for each eye of a user. An advantage of such arrangement is that the number of folded mirrors necessary is reduced to three. Consequently, one optical path only folds light one time, and the HMD system protrudes from the face for a distance shorter than previous designs, and therefore can have a significantly reduced weight, is much closer to the face, and hence produces less fatigue while wearing. The design also means near-eye optics can be used to give a large FOV, but also allows space for the nose of a user to provide a more comfortable configuration to wear.

An aspect of the invention, therefore, is a head-mounted display (HMD) having an enhanced optical arrangement that permits high-resolution imaging in a compact device. In exemplary embodiments, the HMD system includes an optical arrangement; a first image panel, wherein the optical arrangement directs image light from the first image panel along a first optical pathway having a first length; and a second image panel arranged orthogonal to the first image panel, wherein the optical arrangement directs image light from the second image panel along a second optical pathway different from the first optical pathway having a second length. The first length is equal to the second length, and the optical arrangement is configured such that light from the first image panel and the second image panel are emitted from the HMD system in a combined fashion in a first eye direction. Such a configuration respectively may be provided as to each eye.

The optical arrangement may include a plurality of mirror components and a plurality of lens components, wherein the plurality of mirror components are configured to direct image light from the first and second image panels along respective optical pathways to the plurality of lens components. The optical arrangement may include a first mirror assembly that directs image light from the first image panel to a first lens component, and a second mirror assembly that directs image light from the second image panel to the first lens components. The second mirror assembly may have a folded arrangement including a plurality of mirror segments. The optical arrangement may include other components, such as one or more polarizers, quarter waveplate retarders, louvre films, and/or secondary lenses that aid in transmitting the image light along the desired optical pathways.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 2A and FIG. 2B are drawings depicting a side view of another exemplary HMD system including additional polarizers and quarter wave plates in accordance with embodiments of the present invention.

DESCRIPTION OF EMBODIMENTS

Figure 1:
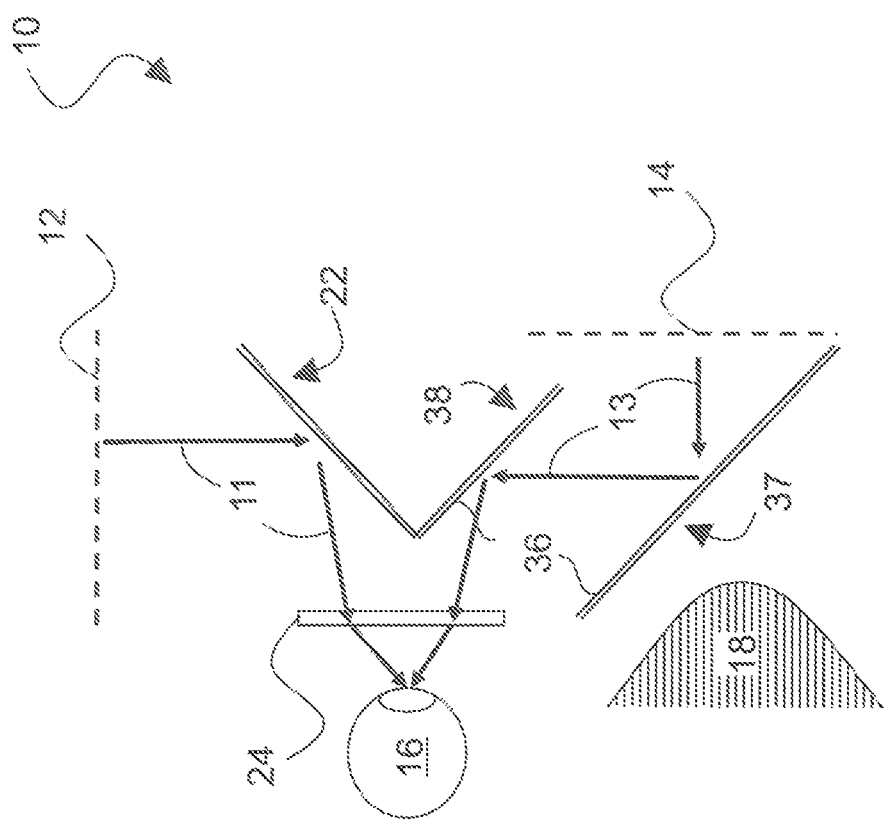
FIG. 1 is a drawing depicting a side view of an optical arrangement in an exemplary head-mounted display (HMD) system in accordance with embodiments of the present invention.

Embodiments of the present invention will now be described with reference to the drawings, wherein like reference numerals are used to refer to like elements throughout. It will be understood that the figures are not necessarily to scale.

The arrangement described herein reduces seam visibility caused by joining two images of different image panels and extends possible range of user eye movement without visible seams. FIG. 1 is a drawing depicting a side view of an optical arrangement for one side of an exemplary head-mounted display (HMD) system 10 in accordance with embodiments of the present invention. In exemplary embodiments, the optical arrangement for the HMD system 10 is positioned in front of each eye of a user, and the HMD system includes four image panels, including first and second image panels of equal dimensions, and third and fourth image panels of equal dimensions that may be combined with overlap by the optical arrangement to one of the first/second image panels to form a wide field of view (FOV) image for a user.

FIG. 1 illustrates pertinent HMD system 10 components in connection with only one of the eyes. It will be appreciated that comparable components depicted in these figures may be provided with respect to the other eye. Referring to the figure, a first image panel 12 is used to present an image in an unshared fashion to an eye 16 of a user and is positioned on a first side of the eye 16 of a user (left of the eye in the viewpoint of the figure). The HMD system 10 further includes a second image panel 14 that is located orthogonal to the first image panel 12 and positioned on a second side of the eye 16 of the user opposite from the first side (right of the eye in the viewpoint of the figure). The optical arrangement directs light from the first image panel 12 and the second image panel 14 along different optical pathways.

The optical arrangement directs light from the two image panels 12 and 14 to form combined images such that the images optimally fill the typical human visual field. The image display panels may be electronically controlled with suitable electronics incorporated into the HMD system in any suitable manner as is known in the art to emit image light corresponding to the desired images from each image panel. Accordingly, for simplicity of illustration the control electronics are omitted from the figures.

In configurations of the optical arrangement, the first image panel 12 is configured in a substantially orthogonal position to a plane extending from the second image panel 14. An advantage of such arrangement is that a longer optical path can be created with an HMD system with fewer components, and the HMD system protrudes from the face for a distance shorter than previous designs, and therefore can have a significantly reduced weight. The system overall is positioned much closer to the face as compared to conventional configurations, and hence produces less torque relative to the head thereby reducing fatigue while wearing. The design also means near-eye optics can be used to give a large FOV, but also allows space for a nose 18 of a user to provide a more comfortable configuration to wear.

The image panels are positioned to emit light that optimally fills a typical visual field. Mirror and lens components of the optical arrangement direct image light from the first image panel 12 along a first optical pathway 11, and light from the second image panel 14 along a second optical pathway 13. The first image panel 12 may be positioned in the optical arrangement 10 so a length of the first optical pathway 11 is equal to a length of the second optical pathway 13. The length is equal despite first optical pathway 11 folding emitted light once and the second optical pathway 13 folding emitted light twice.

Although not shown, in a full HMD system the optical arrangement directs light from a third image panel along a third optical pathway and a fourth image panel along a fourth optical pathway to the second eye of the user. The optical arrangement of the HMD system 10 is configured such that light from the first image panel 12 and the second image panel 14 are transmitted from the HMD system in a combined fashion in a first direction toward the eye 16 of the user, and light from the third image panel and the fourth image panel are transmitted from the HMD system in a combined fashion in a second direction toward a second eye of the user and different from the first direction.

To transmit light from the image panels to the eyes of the user, the optical arrangement of the HMD system 10 may include a plurality of mirror components and a plurality of lens components, wherein the plurality of mirror components are configured to direct image light from the first, second, third, and fourth image panels along the respective optical pathways to the plurality of lens components. In an exemplary embodiment, the optical arrangement of the HMDS system 10 may include three mirrors for each side of the HMD system. For example, one mirror and one image panel are used to form a first part of the image based on image light emitted from the first image panel, and two mirrors and one image panel are used to form second part of the image based on image light from the second image panel (with comparable elements being employed as to the second eye).

Referring to the example of the optical arrangement of FIG. 1, which again pertains to imaging as to only one eye, a first part of the image is transmitted by a first mirror assembly 22, a first lens component 24, and the first image panel 12. The horizontal position of the first image panel 12, being orthogonal to the second image panel 14, reduces seam visibility and thus improves image quality. The first mirror assembly 22 directs image light from the first image panel 12 along the first optical pathway 11 to the first lens component 24, and ultimately to the eye 16 of the user. To minimize the size or footprint of the HMD system, the first mirror assembly 22 may be configured with a single mirror, whereby the optical path 11 of light is increased while maintaining a minimal size. With this configuration, light emitted from the first image panel 12 is directed by the first mirror assembly 22 only through the first lens component 24, and thus only to one eye. The first optical path 11 folds light once to form the first part of the image.

The second part of the image is transmitted by a second mirror assembly 36, the first lens component 24, and the second image panel 14. The second image panel 14 is vertical to make space for the nose 18 of the user. The second mirror assembly 36 directs image light from the second image panel 14 along the second optical pathway 13 to the first lens component 24 and ultimately to the eye 16 of the user. The second mirror assembly 36 is configured with a plurality of mirror segments that are arranged to maintain a minimal size and provide a compact and easily worn configuration. For particular mirror segments, the second mirror assembly 36 includes a first nose segment 37 adjacent to the nose 18 of the user when worn, and a first external segment 38 opposite from the first nose segment 37. In an exemplary embodiment, the first external mirror segment 38 may be formed as a single piece with the first mirror assembly 22, with mirror elements 38 and 22 being configured as an L-shaped knife edge mirror to further improve the image combination. The first nose segment 37 is arranged to accommodate the nose 18 of the user when the HMD system is worn, with the first external segment 38 permitting a controlled directing of the image light in a compact arrangement. The first nose segment 37 and the first external segment 38 may be parallel. The second optical path 13 folds light twice to form the second part of the image.

Although discussed in a vertical arrangement, the optical arrangement 10 may be positioned horizontal such that the first image panel 12 is positioned at the outer edge of the FOV of a user, and the second image panel 14 is positioned at the center of the FOV and over the nose 18 of the user.

Figure 2B:
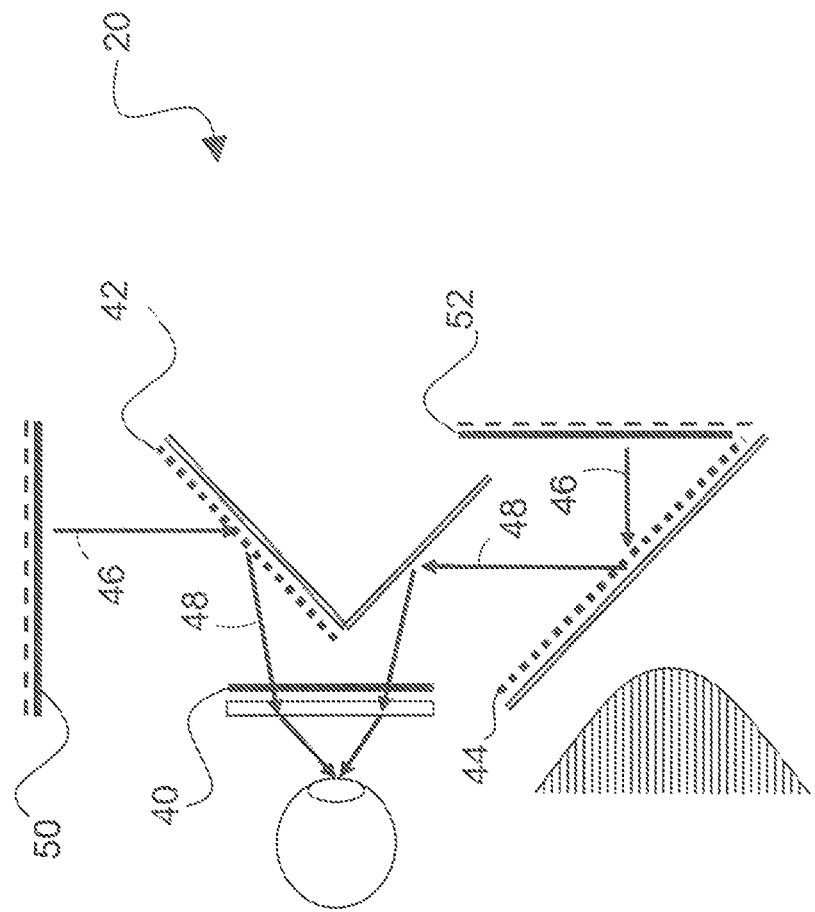

FIG. 2A and FIG. 2B are drawings depicting a side view of another exemplary HMD system 20 including an optical arrangement in accordance with embodiments of the present invention, including additional polarizers and quarter wave plates. The HMD system 20 includes an optical arrangement with additional polarizers and quarter wave plates retarders (QWPs). The image panels, mirror components, and lens components are configured comparably as in the embodiment of FIG. 1. Accordingly, reference numerals for such like components are omitted from FIG. 2A (and likewise are omitted from subsequent figures) so as to more clearly identify the additional features of the various embodiments. Generally, in the configuration of FIG. 2A, polarizers and QWPs may be added to the optical arrangement of the HMD system 20 to minimize ghost imaging, thereby improving overall image quality.

The example configuration of FIG. 2A has particular applicability to HMD systems that employ image panels that emit natively polarized light, such as for example liquid crystal display (LCD) devices. LCDs typically emit light that is natively polarized. In addition, ghost images may be generated if both reflected light and non-reflected light reach the lens components from the image panels. Accordingly, the various image panels may be image panel types that emit natively polarized light, and polarizers and QWPs are added to ensure that light emitted only along certain segments of the optical pathways can be transmitted through the lenses to the user.

In exemplary embodiments, therefore, the optical arrangement further includes a polarizer 40 located on the lens component, and a first QWP 42 and a second QWP 44 located respectively on the first mirror assembly associated with the first image panel and the first nose segment associated with the second image panel. The optical arrangement includes the polarizer 40 to block light from passing through the lenses that are of the native polarization 46 of the image display panels. In this manner, for example, light cannot pass directly from the first image panel 12 through the lens component 24. The optical arrangement further includes a plurality of QWPs. The first QWP 42 and the second QWP 44 operate to alter the polarization of light from the native polarization 46 of the LCDs to a polarization 48 that can pass through the polarizer 40. In this manner, light only passes through the lens component along the desired optical pathways, whereby light may pass through for which polarization is altered by the QWPs, and then directed to the lens component by reflection off of the mirror components. By limiting the passage of light through the lens along only certain optical pathways, ghost images are avoided. This arrangement minimizes ghost images with the polarizer 40 located either behind (as shown in FIG. 2A) or in front of the lens component relative to the eyes when the HMD system is worn.

As referenced above, the example configuration of FIG. 2A has particular applicability to HMD systems that employ image panels that typically emit native polarized light. The embodiment in FIG. 2B uses a first and a second image panel that emit natively non-polarized light. For image panels that natively emit non-polarized light (e.g. organic light-emitting diode displays or OLED displays), additional polarizers can be located in front of the image panels on the non-viewing side to achieve a comparable effect. In this manner, non-polarized light emitted from OLED image panels is immediately polarized comparably as if the light had been emitted from the image panels with a native polarization. FIG. 2B depicts such an embodiment in which a first image panel polarizer 50 and a second image panel polarizer 52 are provided on each of the image display panels. The QWPs 42 and 44 can be placed on the opposing mirrors as well comparably as in the embodiment of FIG. 2A.

Figure 3:
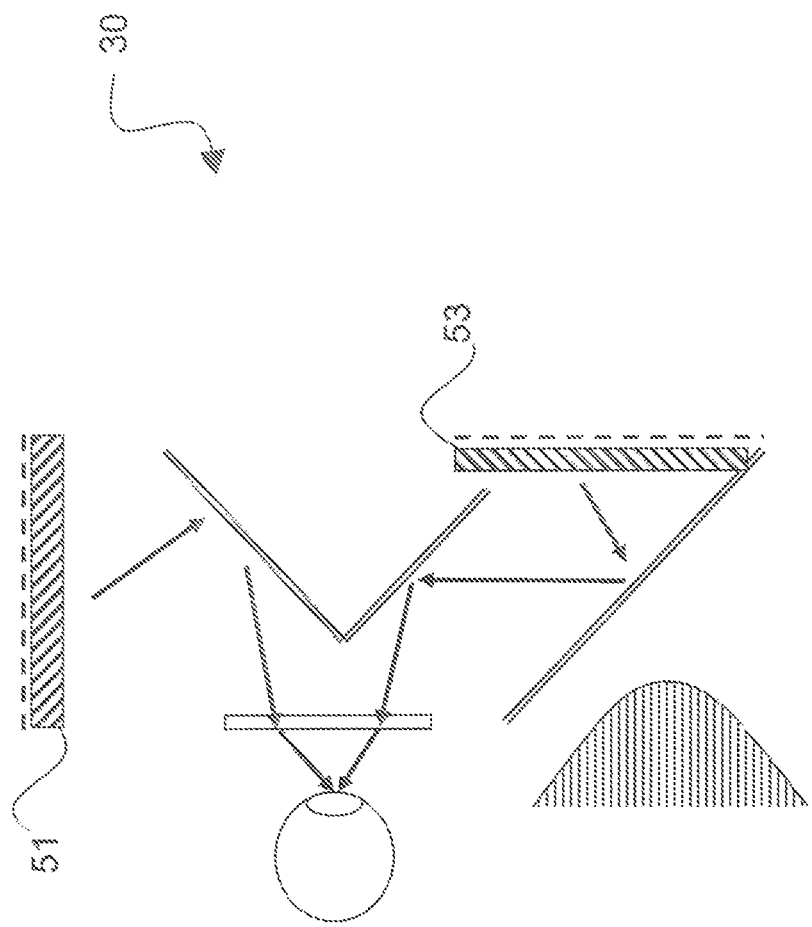
FIG. 3 is a drawing depicting a side view of another exemplary HMD system including additional louver films applied to the image panels in accordance with embodiments of the present invention.

FIG. 3 is a drawing depicting a side view of another exemplary head-mounted display (HMD) system 30 in accordance with embodiments of the present invention, including a first louver film 51 and a second louver film 53 applied to each of the first and second image panels respectively to act as light-directing components. The first louver film 51 and the second louver film 53 operate to direct the image light towards respective and correct mirror components, and away from the lens components, such that only light along the desired optical pathways is emitted through the lens components. The configuration using the first louver film 51 and the second louver film 53 has an advantage of not requiring the light from the image panels to be polarized. A comparable directional effect to direct the light along desired optical pathways also can be achieved by using a directional backlight instead of a louver film.

Figure 4:
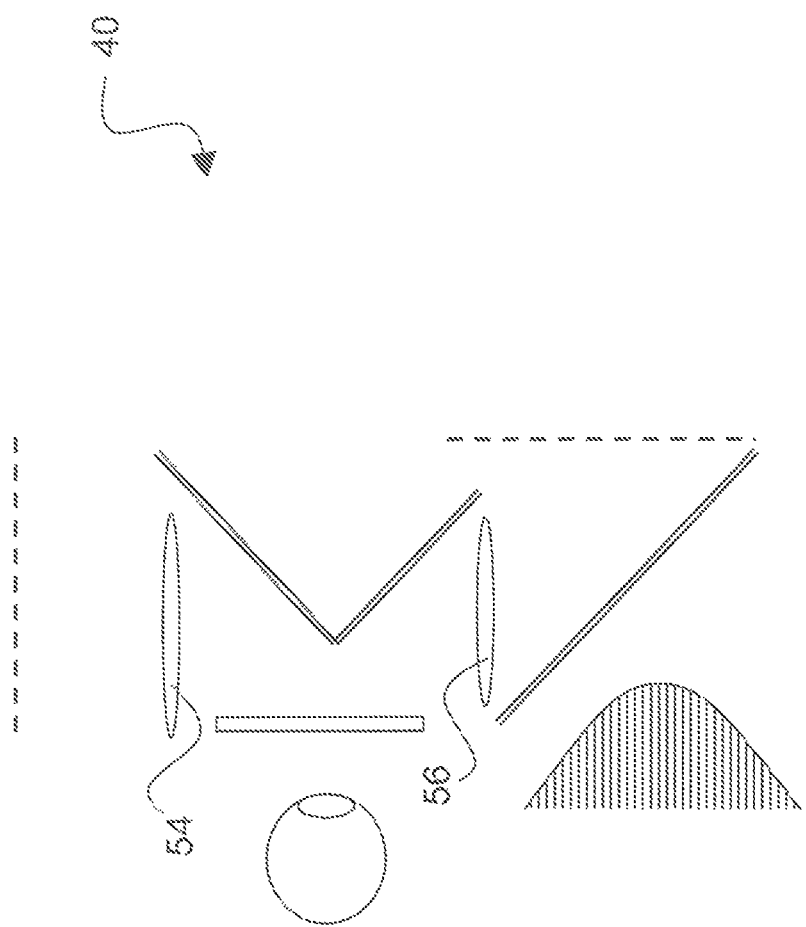
FIG. 4 is a drawing depicting a side view of another exemplary HMD system including additional corrective lens elements in accordance with embodiments of the present invention.

As another example of using a light-directing component, FIG. 4 is a drawing depicting a side view of another exemplary HMD system 40 in accordance with embodiments of the present invention, including a first corrective lens element 54 and a second corrective lens element 56 that are incorporated into the optical arrangement of the HMD system 40 to act as light-directing components. The first corrective lens element 54 and the second corrective lens element 56 operate as a secondary lens for each optical pathway as shown in the figure. This configuration minimizes geometric distortion and otherwise operates to reduce image aberrations such as chromatic aberration. The first corrective lens element 54 and the second corrective lens element 56 each can be a curved lens, a free form lens structure, or a Fresnel lens structure. The corrective lens elements may be combined with one or more of the QWPs, the polarizers, and the louver films described in connection with other embodiments.

Figure 5:
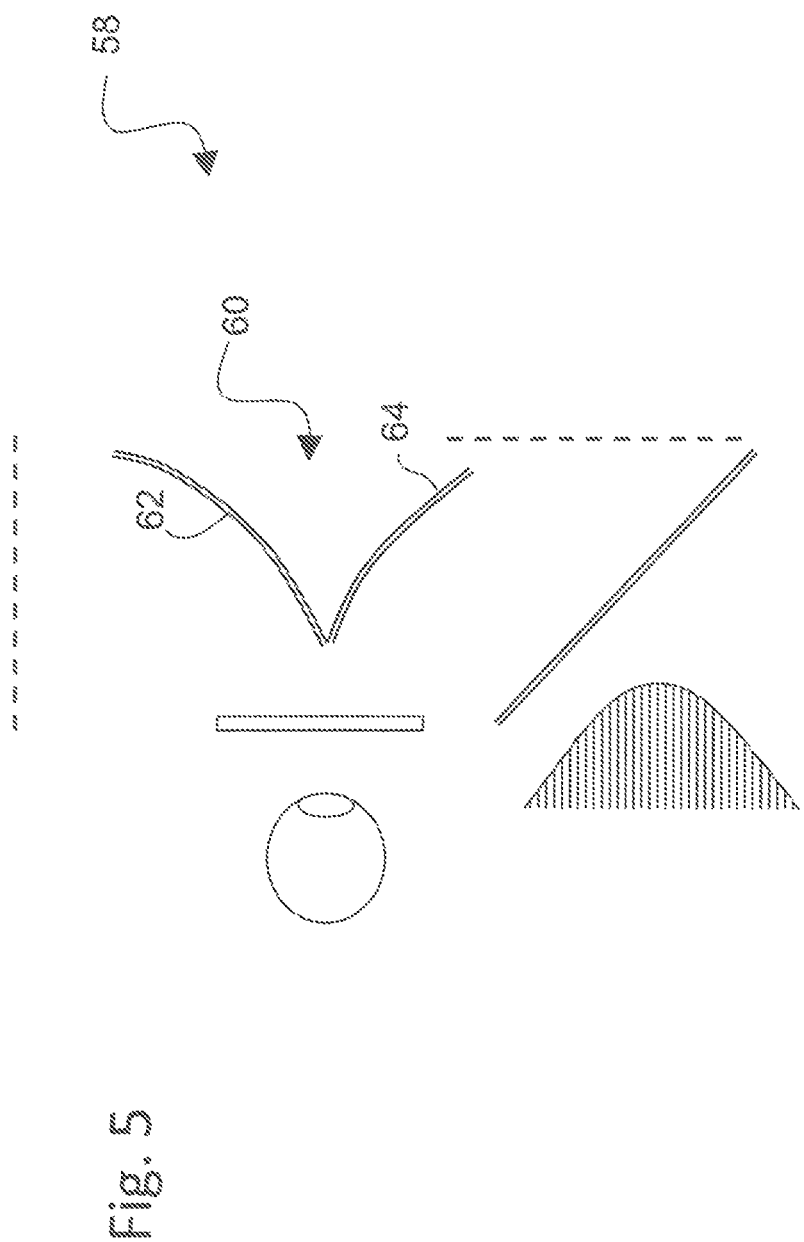
FIG. 5 is a drawing depicting a side view of another exemplary HMD system including a curved mirror assembly in accordance with embodiments of the present invention.

FIG. 5 is a drawing depicting a side view of another exemplary HMD system 58 in accordance with embodiments of the present invention, including a curved mirror assembly. The HMD system 58 may include an optical arrangement with a curved mirror assembly 60. The curved mirror assembly 60 includes a first curved mirror 62 and a second curved mirror 64. The curved mirror assembly 60 can be configured to replace the lens and flat mirrors of previous embodiments. For example, the first curved mirror 62 and the second curved mirror 64 can simultaneously fold the optical path and provide focusing power. The first curved mirror 62 and the second curved mirror 64 may be characterized by a spherical, aspherical, or freeform curve or a combination thereof. The curved mirror assembly 60 may be combined with one or more of the QWPs, the polarizers, and the louver films described in connection with other embodiments.

In an exemplary embodiment, a volume between an image panel and a lens component may be filled with a transparent refractive material. The refractive material operates to improve the field of view. The transparent refractive material may be air or may be a transparent plastic material such as Poly (methyl methacrylate) (PMMA), or similar type of acrylic or comparable transparent plastic material. The refractive material can be shaped to fit the area between the image panels and the lens components and can be attached to or not attached to the image panels themselves.

In addition, the refractive materials may be utilized in combination with components of the embodiments of FIGS. 2A and 2B, including the additional polarizers and QWPs. The polarizers and the QWPs may be bonded to the refractive material, thereby reducing ghost images as described above. Anti-reflection coatings on the polished surfaces of the refractive material, i.e., where the light passes through, also will contribute to reducing ghost images and improve efficiency. The refractive materials also may be used in combination with the louver films of FIG. 3, and/or in combination with the corrective lens components of FIG. 4. The lens components may be formed integral with the refractive materials, i.e., the lens components may be a curved shaping of a respective refractive material, or the lens components may be separate elements bonded to the respective refractive material. Additional description related to refractive materials is provided in U.S. patent application Ser. No. 16/212,815, filed on Dec. 7, 2018, the disclosure of which is hereby incorporated by reference in its entirety for all purposes.

Figure 6:
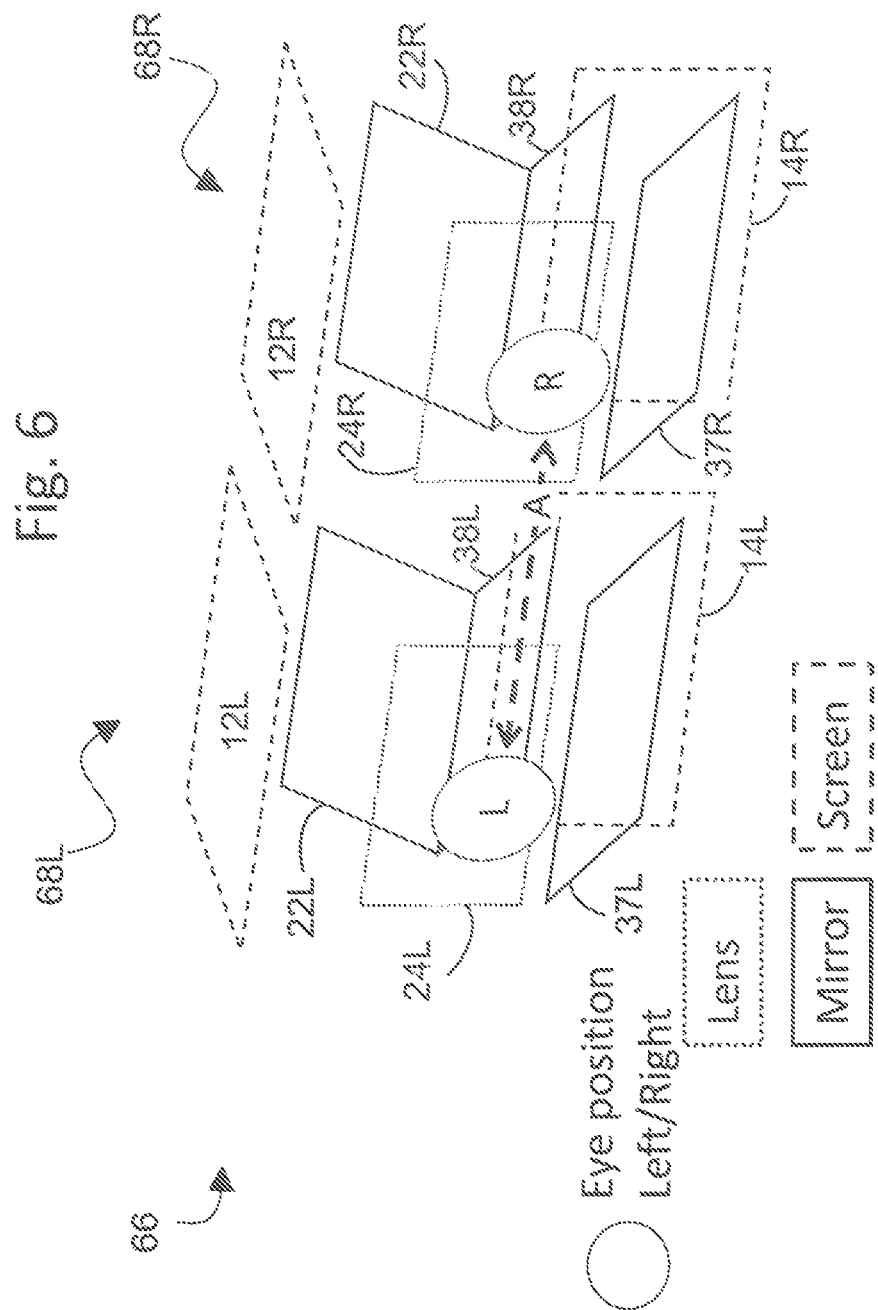
FIG. 6 is a drawing depicting an isometric view of the exemplary HMD system of FIG. 1 with an optical arrangement for each eye of a user in accordance with embodiments of the present invention.

FIG. 6 is a drawing depicting an isometric view of the exemplary HMD system 66 which is comparable to the embodiment of FIG. 1, with an alternative orientation of the system. The viewpoint of FIGS. 6 through 9 is in a direction looking at the eyepieces i.e., as from the direction of the user when the HMD system 66 is being worn. The HMD system 66 includes a first optical arrangement 68R and a second optical arrangement 68L that correspond to a right eye R and a left eye L of the user. Each optical arrangement includes one lens, three mirrors and two display panels as described above. Although some embodiments have been discussed in terms of an optical arrangement, it should be understood that the term optical arrangement encompasses an optical engine with similar elements configured to display an image for a user.

In exemplary embodiments, the first image panel 12R and the third image panel 12L are positioned on opposite sides of an ocular axis A between the eyes of a user. The second image panel 14R and the fourth image panel 14L also are positioned on opposite sides of the ocular axis A. In one exemplary embodiment, the first and second lens components 24R and 24L extend perpendicularly to the ocular axis A. In another exemplary embodiment, the first and second lens components 24R and 24L extend at an acute angle off of perpendicular relative to the ocular axis A. In this manner, the image panels that are not co-planar with the eyepiece are positioned downwards relative to the ocular axis, which permits space for the nose and cheekbones to be located comfortably. Appropriate image processing is then performed so that the images are seen properly aligned in both eyes.

As referenced above, in the example of FIG. 6 the first and second lens components 24R and 24L extend perpendicularly relative to the ocular axis A, although the first and second lens components 24R and 24L may extend substantially perpendicularly being at any acute angle off of perpendicular relative to the ocular axis A so as to optimally allow and configure such additional space for the nose.

Figure 7:
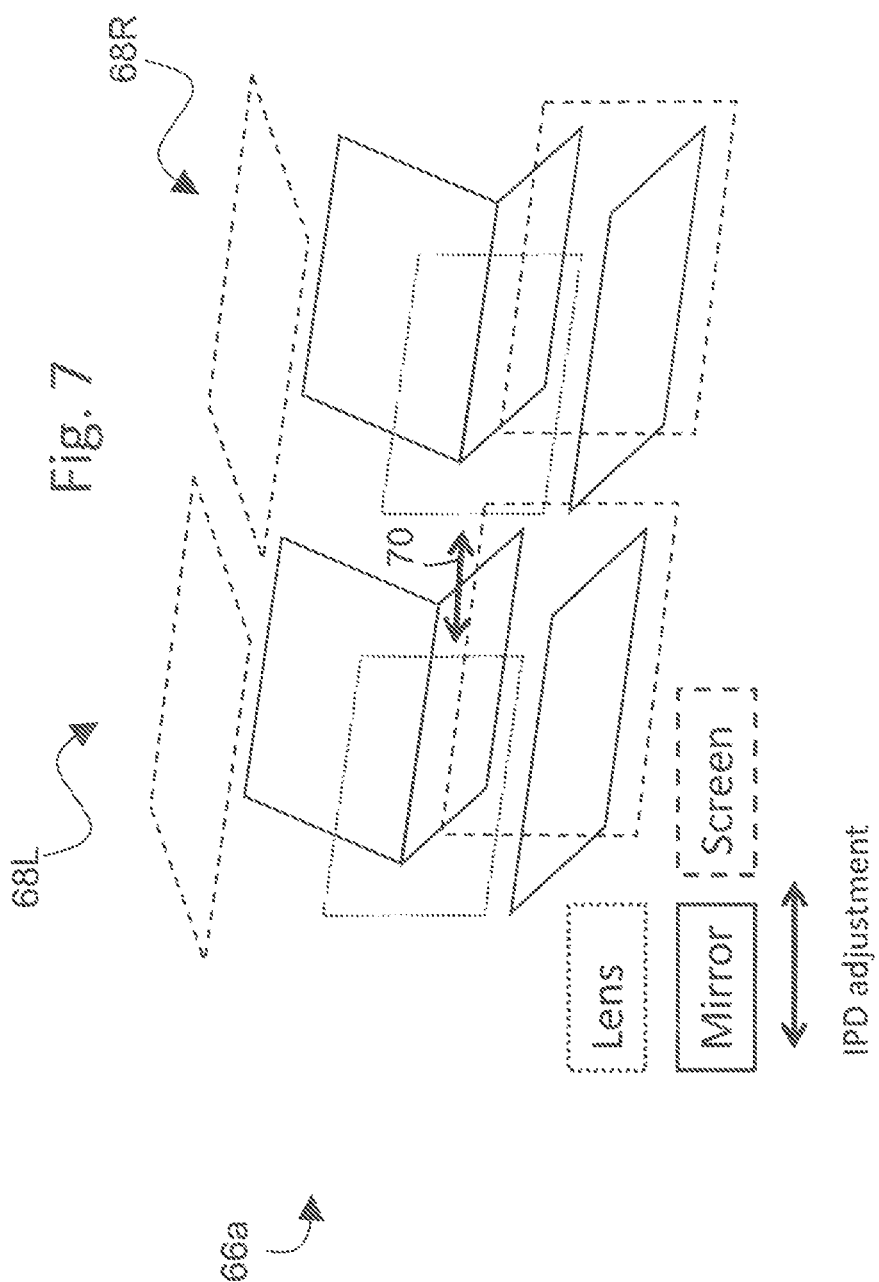
FIG. 7 is a drawing depicting an isometric view of the exemplary HMD system of FIG. 1 with an adjustable interpupillary distance in accordance with embodiments of the present invention.

In this regard, FIG. 7 is a drawing depicting an isometric view of the exemplary HMD system 66a further whereby an interpupillary distance (IPD) 70 can be adjusted by a mechanism to move the first optical arrangement 68R further from or closer to the second optical arrangement 68L. The image display panels may be electronically controlled with suitable electronics incorporated into the HMD system 66a in any suitable manner as is known in the art. The electronics may be configured to determine the IPD 70 between the first optical arrangement 68R and the second optical arrangement 68L, and adjust emitted image light to correspond to the desired images.

Figure 8:
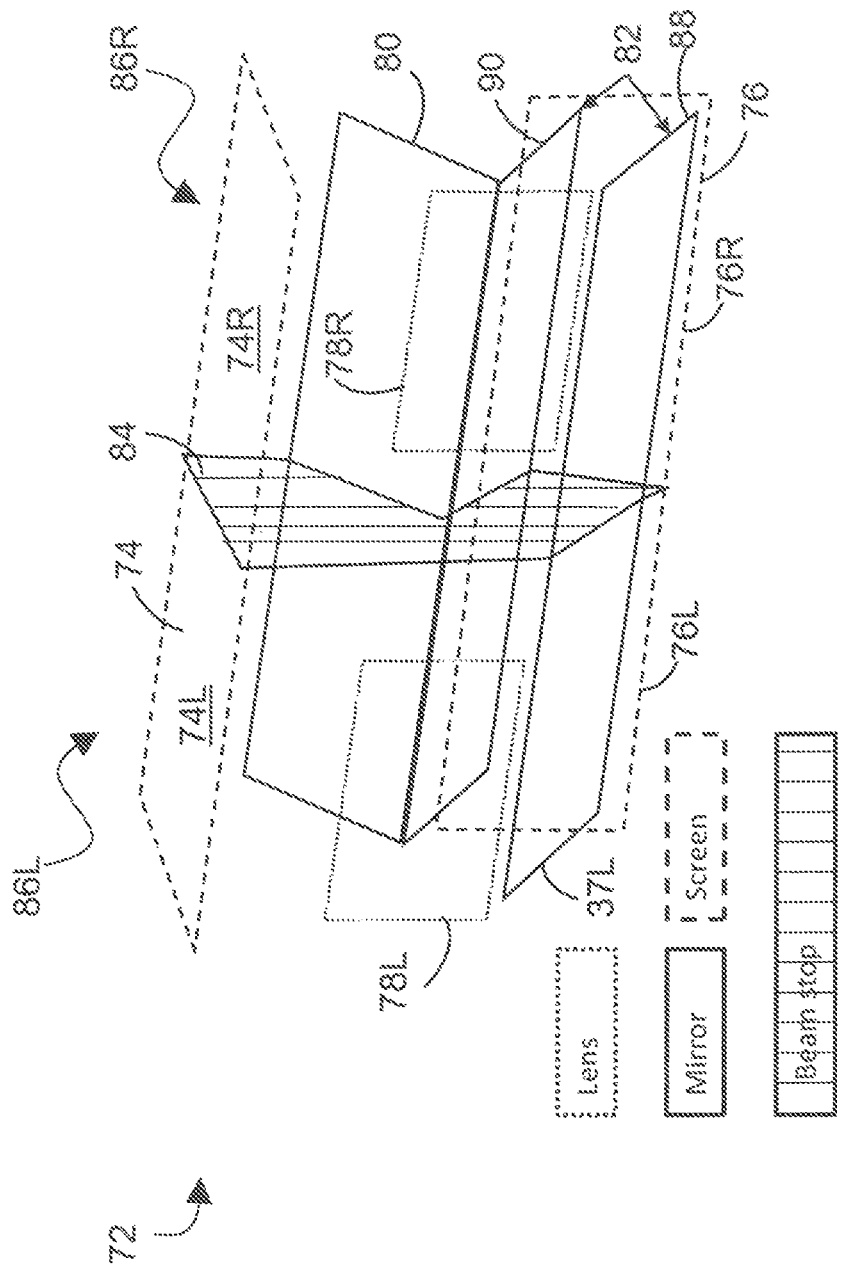
FIG. 8 is a drawing depicting an isometric view of the exemplary HMD system with a unified optical arrangement in accordance with embodiments of the present invention.

FIG. 8 is a drawing depicting an isometric view of an exemplary HMD system 72 with a unified optical arrangement. The HMD system 72 includes a first image panel 74, a second image panel 76 orthogonal to the first image panel 74, a right lens component 78R, a left lens component 78L, a top mirror assembly 80, a bottom mirror assembly 82, and a beam stop 84. The HMD system 72 may be partitioned by the beam stop 84 into a right side 86R and a left side 86L. Crosstalk and stray light may be absorbed by the beam stop 84 in the HMD system 72. The beam stop 84 may be formed using a black absorbing material such as metal, plastic, or the like.

A top half of an image on the right side 86R and the left side 86L of the HMD system 72 may be formed by the first image panel 74 and the top mirror assembly 80. The first image panel 74 may be a single display configured to display a first image 74R on a right side and a second image 74L on a left side of the first image panel 74. The first image 74R and the second image 74L may be separated by the beam stop 84. The top mirror assembly 80 may be a single mirror with a right side and a left side separated by the beam stop 84. The top mirror assembly 80 directs image light from the first image panel 74 along a first optical pathway to the right lens component 78R and the left lens component 78L and ultimately the eyes of the user. The light that forms the top image is folded once along the optical pathway formed by the first image panel 74 and the top mirror assembly 80.

A bottom half of an image on a right side 86R and a left side 86L of the HMD system 72 may be formed by the second image panel 76 and the bottom mirror assembly 82. The second image panel 76 may be a single display configured to display a first image 76R on a right side and a second image 76L on a left side of the second image panel 76. The first image 76R and the second image 76L may be separated by the beam stop 84. The bottom mirror assembly 80 may include a nose-side mirror 88 adjacent to the nose of the user when worn and an external mirror 90 opposite from the nose-side mirror 88. The bottom mirror assembly 82 may be configured with a right side and a left side separated by the beam stop 84. The bottom mirror assembly 82 directs image light from the second image panel 76 along a second optical pathway to the right lens component 78R and the left lens component 78L and ultimately the eyes of the user. The light that forms the bottom image is folded twice along the second optical pathway formed by the second image panel 76, the nose-side mirror 88, and the external mirror 90. The HMD system 72 is configured so that a portion of the top half of the image and a portion of the bottom half of the image overlap to minimize seam visibility.

Figure 9:
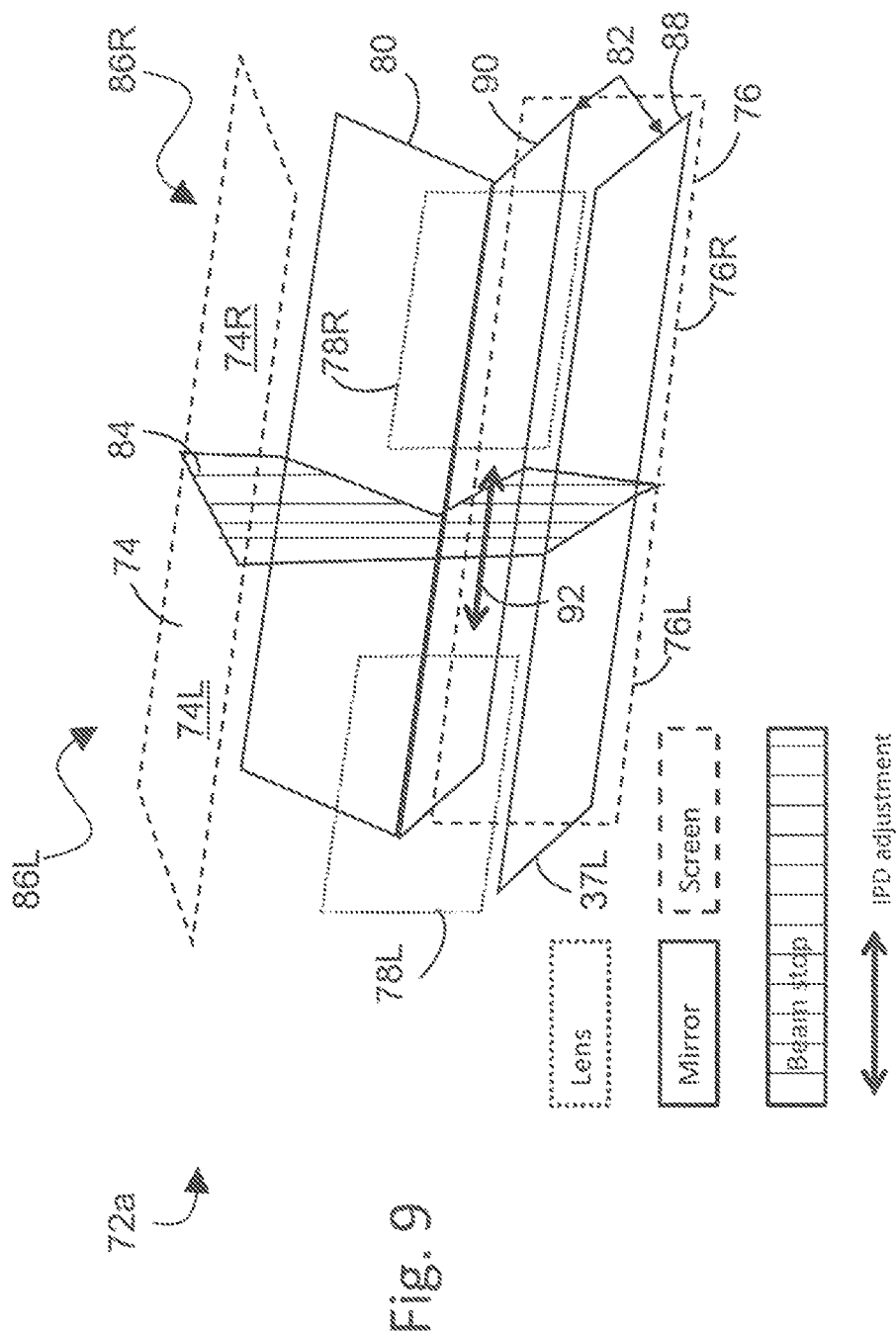
FIG. 9 is a drawing depicting an isometric view of the exemplary HMD system with an adjustable interpupillary distance and a unified optical arrangement in accordance with embodiments of the present invention.

FIG. 9 is a drawing depicting an isometric view of an exemplary HMD system 72a further including an adjustable interpupillary distance and a unified optical arrangement. The right lens component 78R and the left lens component 78L of the HMD system 72 may be configured with an adjustable IPD 92. The HMD system 72 includes a mechanism to move the right lens component 78R further from or closer to the left lens component 78L. The image display panels may be electronically controlled with suitable electronics incorporated into the HMD system 72 in any suitable manner as is known in the art. The electronics may be configured to determine the IPD 92 between the right lens component 78R and the left lens component 78L and adjust emitted image light to correspond to the desired images.

An aspect of the invention, therefore, is a head-mounted display (HMD) having an enhanced optical arrangement that permits high-resolution imaging in a compact device. In exemplary embodiments, the HMD system includes an optical arrangement; a first image panel, wherein the optical arrangement directs image light from the first image panel along a first optical pathway having a first length; and a second image panel arranged orthogonal to the first image panel, wherein the optical arrangement directs image light from the second image panel along a second optical pathway different from the first optical pathway having a second length. The first length is equal to the second length, and the optical arrangement is configured such that light from the first image panel and the second image panel are emitted from the HMD system in a combined fashion in a first eye direction. The HMD system may include one or more of the following features, either individually or in combination.

In an exemplary embodiment of the HMD system, the optical arrangement comprises a plurality of mirror components and a plurality of lens components, wherein the plurality of mirror components are configured to direct image light from the first and second image panels along respective optical pathways to the plurality of lens components.

In an exemplary embodiment of the HMD system, the optical arrangement comprises a first mirror assembly that directs image light from the first image panel to a first lens component, and a second mirror assembly that directs image light from the second image panel to the first lens component.

In an exemplary embodiment of the HMD system, the second mirror assembly has a folded arrangement including a plurality of mirror segments.

In an exemplary embodiment of the HMD system, the optical arrangement further comprises a polarizer located on each of the lens components, and a quarter wave plate retarder located respectively on a mirror component associated with each of the first and second image panels.

In an exemplary embodiment of the HMD system, the optical arrangement includes a plurality of light-directing components that are configured to direct light along the respective first or second optical pathways.

In an exemplary embodiment of the HMD system, the plurality of light-directing components comprises a louver film located on at least one of the first and second image panels.

In an exemplary embodiment of the HMD system, the plurality of light-directing components comprises a plurality of corrective lens elements that operate as a secondary lens for optical pathways of light emitted from each of the first and second image panels.

In an exemplary embodiment of the HMD system, a volume between an image panel and a lens component is filled with a transparent refractive material.

In an exemplary embodiment of the HMD system, the optical arrangement is configured to form a first image associated with the first image panel and a second image associated with the second image panel, and wherein a portion of the first image overlaps a portion of the second image.

In an exemplary embodiment of the HMD system, the HMD system further includes a beam stop configured to partition the HMD system into a right side and a left side.

In an exemplary embodiment of the HMD system, the first image panel is configured to display a first top image on the right side and a second top image on the left side, and wherein the second image panel is configured to display a first bottom image on the right side and a second bottom image on the left side.

In an exemplary embodiment of the HMD system, the HMD system includes an optical arrangement; a first image panel, wherein the optical arrangement directs image light from the first image panel along a first optical pathway having a first length; a second image panel arranged orthogonal to the first image panel, wherein the optical arrangement directs image light from the second image panel along a second optical pathway different from the first optical pathway having a second length; a third image panel wherein the optical arrangement directs image light from the third image panel along a third optical pathway having the first length; and a fourth image panel arranged orthogonal to the third image panel, wherein the optical arrangement directs image light from the fourth image panel along a fourth optical pathway different from the third optical pathway having the second length. The first length is equal to the second length, and wherein the optical arrangement is configured such that light from the first image panel and the second image panel are emitted from the HMD system in a combined fashion in a first eye direction, and light from the third image panel and the fourth image panel are emitted from the HMD system in a combined fashion in a second eye direction.

In an exemplary embodiment of the HMD system, the optical arrangement comprises a plurality of mirror components and a plurality of lens components, wherein the plurality of mirror components are configured to direct image light from the first, second, third, and fourth image panels along respective optical pathways to the plurality of lens components.

In an exemplary embodiment of the HMD system, the optical arrangement comprises a first mirror assembly that directs image light from the first image panel to a first lens component; a second mirror assembly that directs image light from the second image panel to the first lens component; a third mirror assembly that directs image light from the third image panel to a second lens component; and a fourth mirror assembly that directs image light from the fourth image panel to the second lens component.

In an exemplary embodiment of the HMD system, the second mirror assembly and the fourth mirror assembly each has a folded arrangement including a plurality of mirror segments.

In an exemplary embodiment of the HMD system, the optical arrangement further comprises a polarizer located on each of the lens components, and a quarter wave plate retarder located respectively on a mirror component associated with each of the first through fourth image panels.

In an exemplary embodiment of the HMD system, the optical arrangement includes a plurality of light-directing components that are configured to direct light along one of the first through fourth optical pathways.

In an exemplary embodiment of the HMD system, the plurality of light-directing components comprises a louver film located on each of the first, second, third, and fourth image panels.

In an exemplary embodiment of the HMD system, the plurality of light-directing components comprises a plurality of corrective lens elements that operate as a secondary lens for optical pathways of light emitted from each of the first, second, third, and fourth image panels.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to wearable displays, in particular for achieving small and light weight head-mounted display (HMD) systems. Hardware manufactured using this disclosure may be useful in the fields of virtual reality (VR) and augmented reality (AR) for both consumer and professional markets. HMD systems manufactured in accordance with this disclosure could have applications including gaming, entertainment, task support, medical, industrial design, navigation, transport, translation, education, and training.

REFERENCE SIGNS LIST

10—head-mounted display (HMD) system
11—first optical pathway
12—first image panel
12R—right eye first image panel
12L—left eye third image panel
13—second optical pathway
14—second image panel
14R—right eye second image panel
14L—left eye fourth image panel
16—eye
18—nose
20—exemplary HMD system 22—first mirror assembly
24—first lens component
24R—right eye first lens component
24L—left eye second lens component
30—exemplary HMD system
36—second mirror assembly
37—first nose segment
38—first external segment
40—exemplary HMD system
42—first QWP
44—second QWP
46—native polarization
48—polarization
50—first image panel polarizer
51—first louver film
52—second image panel polarizer
53—second louver film
54—first corrective lens element
56—second corrective lens element
58—exemplary HMD system
60—curved mirror assembly
62—first curved mirror
64—second curved mirror
66—exemplary HMD system
66a—exemplary HMD system
68R—right eye first optical arrangement
68L—left eye second optical arrangement
70—interpupillary distance
72—exemplary HMD system
72a—exemplary HMD system
74—first image panel
74R—first image
74L—second image
76—second image panel
76R—right eye first image
76L—left eye second image
78R—right lens component
78L—left lens component
80—top mirror assembly
82—bottom mirror assembly
84—beam stop
86R—right side of HMD system
86L—left side of HMD system
88—nose-side mirror
90—external mirror
92—adjustable interpupillary distance

What is claimed is:

1. A head-mounted display (HMD) system comprising:
an optical arrangement;
a first image panel, wherein the optical arrangement directs image light from the first image panel along a first optical pathway having a first length; and
a second image panel arranged orthogonal to the first image panel, wherein the optical arrangement directs image light from the second image panel along a second optical pathway different from the first optical pathway having a second length;
wherein the first length is equal to the second length, and wherein the optical arrangement is configured such that light from the first image panel and the second image panel are emitted from the HMD system in a combined fashion in a first eye direction;
wherein the optical arrangement comprises a plurality of mirror components and a plurality of lens components, wherein the plurality of mirror components are configured to direct image light from the first and second image panels along respective optical pathways to the plurality of lens components; and
wherein the optical arrangement further comprises a polarizer located on each of the lens components, and a quarter wave plate retarder located respectively on a mirror component associated with each of the first and second image panels.

2. The HMD system of claim 1, wherein the optical arrangement comprises:
a first mirror assembly that directs image light from the first image panel to a first lens component; and
a second mirror assembly that directs image light from the second image panel to the first lens component.

3. The HMD system of claim 2, wherein the second mirror assembly has a folded arrangement including a plurality of mirror segments.

4. The HMD system of claim 1, wherein the optical arrangement includes a plurality of light-directing components that are configured to direct light along the respective first or second optical pathways.

5. The HMD system of claim 4, wherein the plurality of light-directing components comprises a louver film located on at least one of the first and second image panels.

6. The HMD system of claim 4, wherein the plurality of light-directing components comprises a plurality of corrective lens elements that operate as a secondary lens for optical pathways of light emitted from each of the first and second image panels.

7. The HMD system of claim 1, wherein a volume between an image panel and a lens component is filled with a transparent refractive material.

8. The HMD system of claim 1 wherein the optical arrangement is configured to form a first image associated with the first image panel and a second image associated with the second image panel, and wherein a portion of the first image overlaps a portion of the second image.

9. A head-mounted display (HMD) system comprising:
an optical arrangement;
a first image panel, wherein the optical arrangement directs image light from the first image panel along a first optical pathway having a first length;
a second image panel arranged orthogonal to the first image panel, wherein the optical arrangement directs image light from the second image panel along a second optical pathway different from the first optical pathway having a second length;
a third image panel wherein the optical arrangement directs image light from the third image panel along a third optical pathway having the first length; and
a fourth image panel arranged orthogonal to the third image panel, wherein the optical arrangement directs image light from the fourth image panel along a fourth optical pathway different from the third optical pathway having the second length;
wherein the first length is equal to the second length, and wherein the optical arrangement is configured such that light from the first image panel and the second image panel are emitted from the HMD system in a combined fashion in a first eye direction, and light from the third image panel and the fourth image panel are emitted from the HMD system in a combined fashion in a second eye direction.

10. The HMD system of any of claim 9, wherein the optical arrangement comprises a plurality of mirror components and a plurality of lens components, wherein the plurality of mirror components are configured to direct image light from the first, second, third, and fourth image panels along respective optical pathways to the plurality of lens components.

11. The HMD system of claim 10, wherein the optical arrangement comprises:
   a first mirror assembly that directs image light from the first image panel to a first lens component;
   a second mirror assembly that directs image light from the second image panel to the first lens component;
   a third mirror assembly that directs image light from the third image panel to a second lens component; and
   a fourth mirror assembly that directs image light from the fourth image panel to the second lens component.

12. The HMD system of claim 10, wherein the optical arrangement further comprises a polarizer located on each of the lens components, and a quarter wave plate retarder located respectively on a mirror component associated with each of the first through fourth image panels.

13. The HMD system of claim 9, wherein the optical arrangement includes a plurality of light-directing components that are configured to direct light along one of the first through fourth optical pathways.

14. The HMD system of claim 13, wherein the plurality of light-directing components comprises a louver film located on each of the first, second, third, and fourth image panels.

15. The HMD system of claim 13, wherein the plurality of light-directing components comprises a plurality of corrective lens elements that operate as a secondary lens for optical pathways of light emitted from each of the first, second, third, and fourth image panels.

16. A head-mounted display (HMD) system comprising:
   an optical arrangement;
   a first image panel, wherein the optical arrangement directs image light from the first image panel along a first optical pathway having a first length; and
   a second image panel arranged orthogonal to the first image panel, wherein the optical arrangement directs image light from the second image panel along a second optical pathway different from the first optical pathway having a second length;
   wherein the first length is equal to the second length, and wherein the optical arrangement is configured such that light from the first image panel and the second image panel are emitted from the HMD system in a combined fashion in a first eye direction;
   wherein the optical arrangement includes a plurality of light-directing components that are configured to direct light along the respective first or second optical pathways; and
   wherein the plurality of light-directing components comprises a louver film located on at least one of the first and second image panels.

17. The HMD system of claim 16, wherein the optical arrangement comprises a plurality of mirror components and a plurality of lens components, wherein the plurality of mirror components are configured to direct image light from the first and second image panels along respective optical pathways to the plurality of lens components.

18. The HMD system of claim 17, wherein the optical arrangement comprises:
   a first mirror assembly that directs image light from the first image panel to a first lens component; and
   a second mirror assembly that directs image light from the second image panel to the first lens component.

19. The HMD system of claim 18, wherein the second mirror assembly has a folded arrangement including a plurality of mirror segments.

* * * * *